United States Patent
Schell

(10) Patent No.: US 9,518,892 B1
(45) Date of Patent: Dec. 13, 2016

(54) APPARATUS FOR IDENTIFYING OPTICAL ARRAY POLARITY AND MEASURING OPTICAL SIGNAL AND POWER OR LOSS

(71) Applicant: FLUKE CORPORATION, Everett, WA (US)

(72) Inventor: J. David Schell, Austin, TX (US)

(73) Assignee: FLUKE CORPORATION, Everett, WA (US)

( * ) Notice: Subject to any disclaimer, the term of this patent is extended or adjusted under 35 U.S.C. 154(b) by 0 days.

(21) Appl. No.: 14/830,564

(22) Filed: Aug. 19, 2015

(51) Int. Cl.
| | | |
|---|---|---|
| *G01N 21/00* | (2006.01) | |
| *G01M 11/00* | (2006.01) | |
| *G02B 6/38* | (2006.01) | |
| *G01D 5/26* | (2006.01) | |
| *G01J 1/42* | (2006.01) | |

(52) U.S. Cl.
CPC .............. *G01M 11/33* (2013.01); *G01D 5/268* (2013.01); *G01J 1/42* (2013.01); *G02B 6/3885* (2013.01); *G02B 6/3895* (2013.01)

(58) Field of Classification Search
CPC . G01M 11/3145; G01M 11/335; G01M 11/33; G01M 11/3109; G01M 11/338
See application file for complete search history.

(56) References Cited

U.S. PATENT DOCUMENTS

| | | | | |
|---|---|---|---|---|
| 5,555,086 A | * | 9/1996 | vonBieren | G01D 5/35383 250/227.27 |
| 6,529,652 B1 | * | 3/2003 | Brener | G02B 6/3586 385/16 |
| 6,591,029 B1 | * | 7/2003 | Lin | G02B 6/3588 385/17 |
| 2002/0172448 A1 | * | 11/2002 | Paniccia | G02B 6/3588 385/16 |
| 2004/0190811 A1 | * | 9/2004 | Winfield | G01H 9/004 385/12 |
| 2004/0247223 A1 | * | 12/2004 | Tietjen | G01D 5/35383 385/7 |

(Continued)

OTHER PUBLICATIONS

"Optotest Corporation—Integrating Sphere OP-SPHR," retrieved from http://www.optotest.com/op-sphr-integrating-sphere/ on Jul. 10, 2015; 2 pgs.

(Continued)

*Primary Examiner* — Tarifur Chowdhury
*Assistant Examiner* — Md M Rahman
(74) *Attorney, Agent, or Firm* — Seed IP Law Group LLP

(57) ABSTRACT

An apparatus for determining optical fiber array polarity is disclosed. The apparatus may be used to determine optical signal loss or intensity. An adapter may be used to couple the apparatus to a variety of optical fiber connectors. The apparatus includes a position sensing detector and processing circuitry. The position sensing detector includes a sensor that receives optical signals and electrodes that output respective output signals in response to receipt of an optical signal. The processing circuitry receives the output signals and identifies locations at which the optical signals were incident on the sensor. The processing circuitry also determines the receiving position in the optical array of an optical fiber and a polarity of the optical array based on the receiving position and a corresponding transmitting position. The processing circuitry may determine an intensity or loss of the optical signal based on an aggregate of the output signals.

20 Claims, 6 Drawing Sheets

(56) References Cited

U.S. PATENT DOCUMENTS

2006/0210214 A1* 9/2006 Uhlhorn .............. G02B 6/4206
385/14

OTHER PUBLICATIONS

Fluke Networks, "MultiFiber™ Pro Optical Power Meter and Fiber Test Kits," retrieved from http://www.flukenetworks.com/MultiFiberPro/ on Jul. 10, 2015; 4 pgs.

OSI Optoelectronics, "Segmented Photodiodes (SPOT Series)," retrieved from http://www.osioptoelectronics.com/ on Jul. 10, 2015; 5 pgs.

Cody, Joseph, "Corning, TSB—Understanding duplex and single row fiber polarity," Jun. 9, 2015; Quebec City; TR-42.11 Optical Systems; 26 pgs.

"MultiFiber Pro Optical Power Meter and Fiber Test Kits—Singlemode and Multimode," retrieved from http://www.flukenetworks.com/datacom-cabling/fiber-testing/multifiber-pro-optical-power/ on Jul. 10, 2015; 5 pgs.

"Large Area Detector Optical Power Meter," retrieved from http://www.kingfisherfiber.com/Fiber-Optic-Test-Equipment/KI2600-Optical-Power-Meter/ on Jul. 10, 2015; 3 pgs.

"MPO Testing," retrieved from http://www.psiber.com/en/home/products/cable-tester/mpo-testing.html/ on Jul. 10, 2015; 1 pg.

* cited by examiner

APPARATUS FOR IDENTIFYING OPTICAL ARRAY POLARITY AND MEASURING OPTICAL SIGNAL AND POWER OR LOSS

BACKGROUND

Technical Field

This application is directed to a device for identifying optical array polarity and/or measuring optical signal power or loss, and in particular a device that performs the identification and measurement using a position sensing detector.

Description of the Related Art

Conventional devices that measure optical signal intensity utilize an optical detector that is coupled individually to each optical fiber of the optical array. A conventional device may be used to measure the optical intensity of an optical signal transmitted through each optical fiber of the array. However, the need to couple the device to each optical fiber individually in order to obtain an intensity measurement is time consuming.

Some conventional devices are equipped with a multiple sensors, whereby each sensor captures an optical signal received from a respective optical fiber of the array. For these devices to work properly, the sensors must be respectively aligned with the optical fibers. Due to the fact that optical array connectors, such as multi-fiber push-on (MPO) connectors, are gender-specific (i.e., pinned or unpinned), a gender-compliant device is required in order to attach the device to the connector and ensure alignment. Thus, personnel performing field tests on optical arrays may need to carry multiple devices for both genders. The alternative use of patch cords to reverse gender may introduce artifacts in measurement results and adds uncertainty. Furthermore, these devices are only usable for optical arrays of a certain size (having specific number of rows or columns of optical fibers). They may not be used to test a multitude of other commercially available arrays that differ in terms of the number of rows or columns of optical fibers than for which the device is designed.

BRIEF SUMMARY

An apparatus for determining an optical fiber array polarity is described. The apparatus includes a position sensing detector. The position sensing detector has a sensor that is positionable with respect to an optical array. The sensor receives, from the optical array, a plurality of optical signals that are incident on the sensor while the sensor remains in a fixed position relative to the optical array. The plurality of optical signals emanate from a corresponding plurality of optical fibers forming the optical array, whereby each optical fiber of the plurality of optical fibers has an associated transmitting position and receiving position in the optical array relative to other optical fibers in the optical array. The position sensing detector has a plurality of electrodes electrically coupled to the sensor. The plurality of electrodes outputs a respective plurality of output signals in response to receipt of an optical signal of the plurality of optical signals by the sensor. The plurality of output signals are indicative of a location at which the optical signal of the plurality of optical signals was incident on the sensor.

In an embodiment, the apparatus includes a processing circuitry electrically coupled to the plurality of electrodes. The processing circuitry receives the plurality of output signals for each of the plurality of optical signals and identifies respective locations at which the plurality of optical signals were incident on the sensor. The processing circuitry also determines, based on the identified locations, the receiving position in the optical array of at least one optical fiber of the plurality of optical fibers. Further, the processing circuitry determines a polarity of the optical array based on the determined receiving position of the at least one optical fiber and a corresponding transmitting position in the optical array of the at least one optical fiber.

A method for determining optical fiber array polarity is also described. In the method, a plurality of optical signals are received from an optical array at a sensor of a position sensing detector. The plurality of optical signals are incident on the sensor while the sensor remains in a fixed position relative to the optical array. The plurality of optical signals emanate from a corresponding plurality of optical fibers forming the optical array, whereby the sensor is positionable with respect to the optical array and each optical fiber of the plurality of optical fibers has an associated transmitting position and receiving position relative to other optical fibers in the optical array.

In one embodiment, a plurality of electrodes of the position sensing detector output a respective plurality of output signals in response to receipt of an optical signal of the plurality of optical signals by the sensor. Each output signal of the plurality of output signals indicates a proximity of a location at which the optical signal of the plurality of optical signals was incident on the sensor to a respective electrode of the plurality of electrodes.

Further, respective locations at which the plurality of optical signals were incident on the sensor are identified for the plurality of optical signals. The respective locations are identified based on the corresponding plurality of output signals for each received optical signal. The receiving position in the optical array of at least one optical fiber of the plurality of optical fibers is determined based on the identified locations. In addition, a polarity of the optical array is determined based on the determined receiving position and a corresponding transmitting position in the optical array of the at least one optical fiber.

An apparatus for measuring optical signal intensity is described. The apparatus includes a position sensing detector. The position sensing detector includes an optical sensor positionable with respect to an optical array. The optical sensor has a single substrate optical sensing area sized sufficient to receive a plurality of optical signals from the optical array while the optical sensing area remains in a fixed position relative to the optical array. The optical sensor receives an optical signal at a location within the optical sensing area.

The position sensing detector includes a plurality of electrodes electrically coupled to the optical sensing area. The plurality of electrodes output a respective plurality of output signals in response to receipt of the optical signal by the optical sensing area. Each output signal of the plurality of output signals has an electrical characteristic that is proportional to both an intensity of the optical signal and a proximity of the location at which the optical signal was received to a corresponding electrode of the plurality of electrodes.

In an embodiment, the apparatus includes an adder that receives and aggregates the plurality of output signals and produces an output signal aggregate for the optical signal. In yet another embodiment, the apparatus includes a processing circuitry electrically coupled to the adder, whereby the processing circuitry receives the output signal aggregate and determines an intensity of the optical signal based on the output signal aggregate. The determined intensity of the optical signal is proportional to the output signal aggregate.

DETAILED DESCRIPTION

In various embodiments, described herein is an apparatus for determining an optical fiber array polarity. When optical signals from the optical array are incident on a planar sensor, electrodes electrically coupled to the planar sensor produce output signals that are indicative of a location at which each optical signal was incident on the planar sensor. Processing circuitry identifies respective locations of the optical signals and determines a polarity of the optical fibers in the optical array. Also described herein, in various embodiments, is an apparatus for measuring optical signal intensity. Summing circuitry receives and aggregates a plurality of output signals from electrodes coupled to an optical sensor and processing circuitry determines an intensity of an optical signal based on the aggregate of the output signals.

Figure 1:
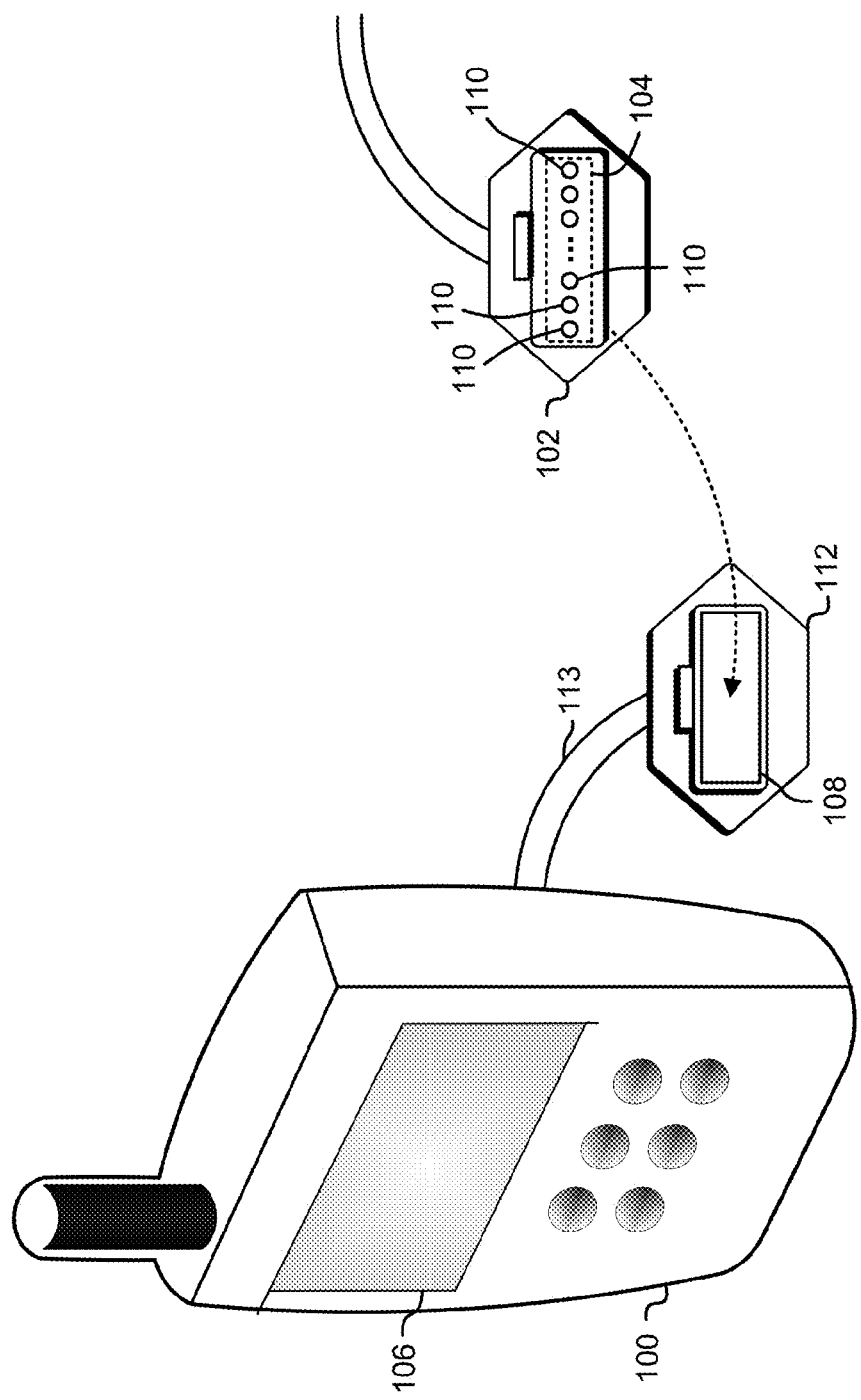
FIG. 1 shows an optical fiber testing device that is couplable to an optical fiber connector having an optical fiber array.

FIG. 1 illustrates at least one embodiment of an optical fiber testing device 100 that is couplable to an optical fiber connector 102 having an optical fiber array 104. The optical fiber testing device 100 includes an interface 106 to a user of the optical fiber testing device 100. The interface 106 may be used to provide the results of tests or measurements performed by the optical fiber testing device 100 to the user. The interface 106 is shown to be a screen in FIG. 1 but in various embodiments the interface 106 may be a speaker or a light emitting diode (LED) panel, among others. Furthermore, the interface 106 include a wireless or wired modem that transmits the test or measurement results to another device, such as a computer, tablet, smartphone or server, among others, to display the results of the tests or measurements to the user.

The optical fiber testing device 100 further comprises an optical sensor 108 that is positionable with respect to the optical fiber array 104. The optical sensor 108 receives from the optical array 104 a plurality of optical signals emanating from a corresponding plurality of optical fibers 110 (singularly referred to hereinafter as optical fiber 110). In various embodiments, the optical sensor 108 may be a single substrate, large area semiconductor optical detector that receives the plurality of optical signals from the optical array 104 while the optical array 104 remains at a substantially fixed position with respect to the optical sensor 108. The optical sensor 108 receives the plurality of optical signals by having the optical signals fall incident on an optical sensing area of the optical sensor 108. The optical sensing area of the optical sensor 108 is large enough to encompass or cover an area defined by the end faces of the optical fibers 110 in the optical array 104. Due to the size of the optical sensing area, the optical sensor 104 may capture the plurality of optical signals emanating from the optical array 104 with little or negligible optical loss. A smaller sensing area may be utilized if an optical system (for example, a lens) is positioned between the optical array 104 and the sensing area such that optical signals (that would otherwise be incident outside the optical sensing area) are redirected to be fully captured by the optical sensing area.

An adapter (for example, a mechanical adapter) may be used to couple the optical fiber connector 102 to the optical sensor 108. The adapter may have a corresponding gender or shape that is compliant and designed to fit the optical fiber connector 102. While the optical fiber testing device 100 is used, various adapters may be interchanged to accommodate various optical fiber connector 102 having different genders or shapes. When testing optical fiber arrays 104 having different connectors, the adapter may be swapped for another compliant adapter to couple the connector 102 to the optical sensor 108.

Additionally, the optical sensor 108 may be positioned with respect to the optical array 104 and receive optical signals from the optical array 104 without requiring a specific shaped connector to couple the optical sensor 108 to the optical array 104. The optical sensor 108 may therefore be used with a variety of optical arrays 104 having different shaped connectors.

Use of an optical sensor 108 having an optical sensing area is advantageous due to the fact that the optical fiber testing device 100 may be used to test optical arrays of various configurations. The configuration of an optical array 104 includes the number of rows or columns of optical fibers 110 in the optical array 104 as well the spacing between the optical fibers 110. For example, some optical arrays have a row of twelve optical fibers 110, whereas other optical arrays have three rows each having twelve optical fibers 110. The optical fiber testing device 100 may be used to test optical arrays of different configurations if the optical sensing area is sized and dimensioned large enough to capture optical signals emanating the optical arrays. Alternatively, as described herein, if the optical sensing area is not large enough capture all optical signals, a lens may be used to redirected, to the optical sensing area, optical signals that would be otherwise impinge outside of the optical sensing area. To determine array polarity or measure optical signal intensity, optical arrays having any configuration may be positioned such that optical signals emanating from the array are captured by the optical sensing area of the optical sensor 108. As described herein, optically coupling the optical array 104 to the optical fiber testing device 100 includes positioning the optical array 104 with respect the optical sensor 108 such that optical signals emanating from the optical array 104 are captured or sensed by the optical sensing area of the optical sensor 108.

In some embodiments, the connector 112 may be compliant with the optical fiber connector 102 of the optical array 104. The testing device connector 112 is compliant with the optical fiber connector 102 if it has the opposite gender as that of the optical fiber connector 102. For example, if the optical fiber connector 102 is pinned, the testing device connector 112 may be unpinned and vice-versa.

As shown in FIG. 1, the optical sensor 108 may be disposed on a connector 112 of the testing device 100. The optical sensor 108 may be electrically coupled to the testing device 100 using a wire connection 113. Alternatively, the optical sensor 108 may be disposed on a housing of the testing device 100. For example, the optical sensor 108 may be disposed on the front or the back of the testing device 100.

As described herein, the optical fiber testing device 100 may be used to determine the polarity of the optical fiber array 104. Furthermore, the optical fiber testing device 100 may be used to determine an intensity of an optical signal emanating from an optical fiber 110 of the optical array 104. The intensity may reflect a strength or power of the optical signal. The intensity may also be used to measure a loss associated with the optical signal as it traverses the optical fiber 110. The optical signal may encounter a loss of strength or power due to, for example, imperfections in the optical fiber 110 or dust particles on an end face of the optical fiber 110. The loss may be calculated based at least in part on the difference between the intensity of the optical signal transmitted into the optical fiber 110 and the optical signal received by the optical fiber testing device 100.

Figure 2:
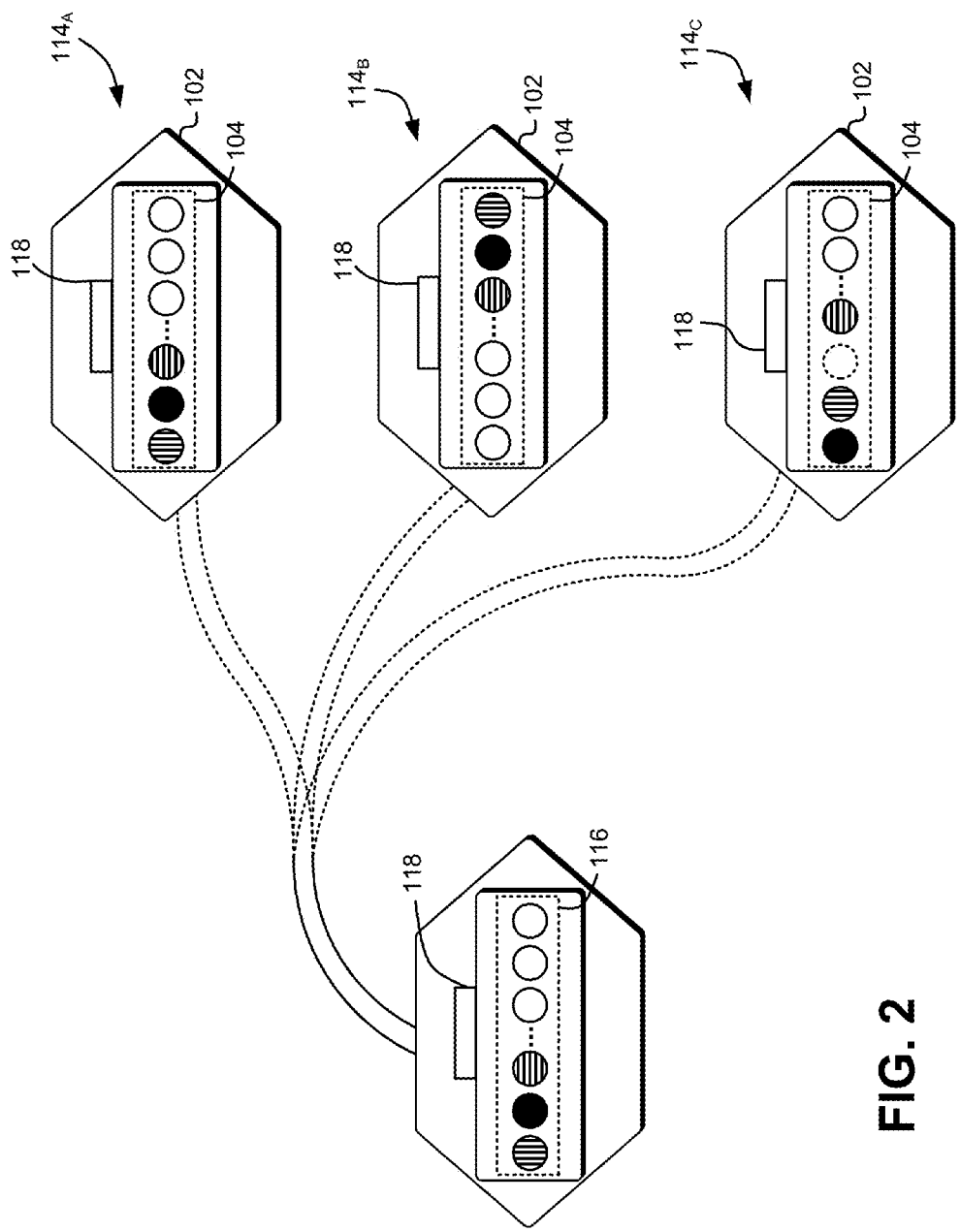
FIG. 2 shows an illustration of optical fiber array polarity.

FIG. 2 shows an illustration of optical fiber array polarity. The optical fiber array 104 may have any one of a number of polarities, whereby three polarities $114_{A-C}$ are described with reference to FIG. 2. A polarity of an optical fiber array 104 refers to a relationship between a transmitting position and a receiving position of an optical fiber 110 in the array 104 relative to other optical fibers in the array 104.

In a first polarity $114_A$ (known as a "Type A" polarity as defined by ANSI/TIA-568), a receiving position of an optical signal in the optical fiber array 104, which is a receipt-side optical fiber array, is the same as a transmitting position of the optical signal in a transmit-side optical fiber array 116. The transmitting and receiving positions may be referenced by a key 118 of an array's connector 102. For example, a first position may be the leftmost position in relation to the key 118 and a second position may be the second position from the left in relation to the key 118 and so on. Although an optical array 104 comprising one row of optical fibers is described with reference to FIG. 2, it is noted that various optical arrays may have more than one row of optical fibers 110.

A second polarity $114_B$ (known as a "Type B" polarity) calls for the receiving position of the optical signal to be transposed with respect to the transmitting position. Accordingly, an optical signal that is transmitted into an optical fiber at the leftmost position with respect to the key 118 on the transmit-side optical array will be received at the rightmost position with respect to the key 118 on the receive-side optical fiber array 104. Similarly, an optical signal that is transmitted into an optical fiber at the position that is third from left with respect to the key 118 on the transmit side will be received at the position that is third from right on the receive side of the optical fiber array 104.

According to a third polarity $114_C$ (known as a "Type C" polarity), the receiving position of the optical signal will be pairwise transposed with respect to the transmitting position. Accordingly, an optical signal that is transmitted into an optical fiber at the leftmost position with respect to the key 118 on the transmit side will be received at the second position from the left with respect to the key 118 in the receive-side optical fiber array 104 and vice-versa. Similarly, an optical signal that is transmitted into an optical fiber at a position that is third from left with respect to the key 118 on the transmit side will be received at the position that is fourth from the left in the receive-side the optical fiber array 104.

Figure 3:
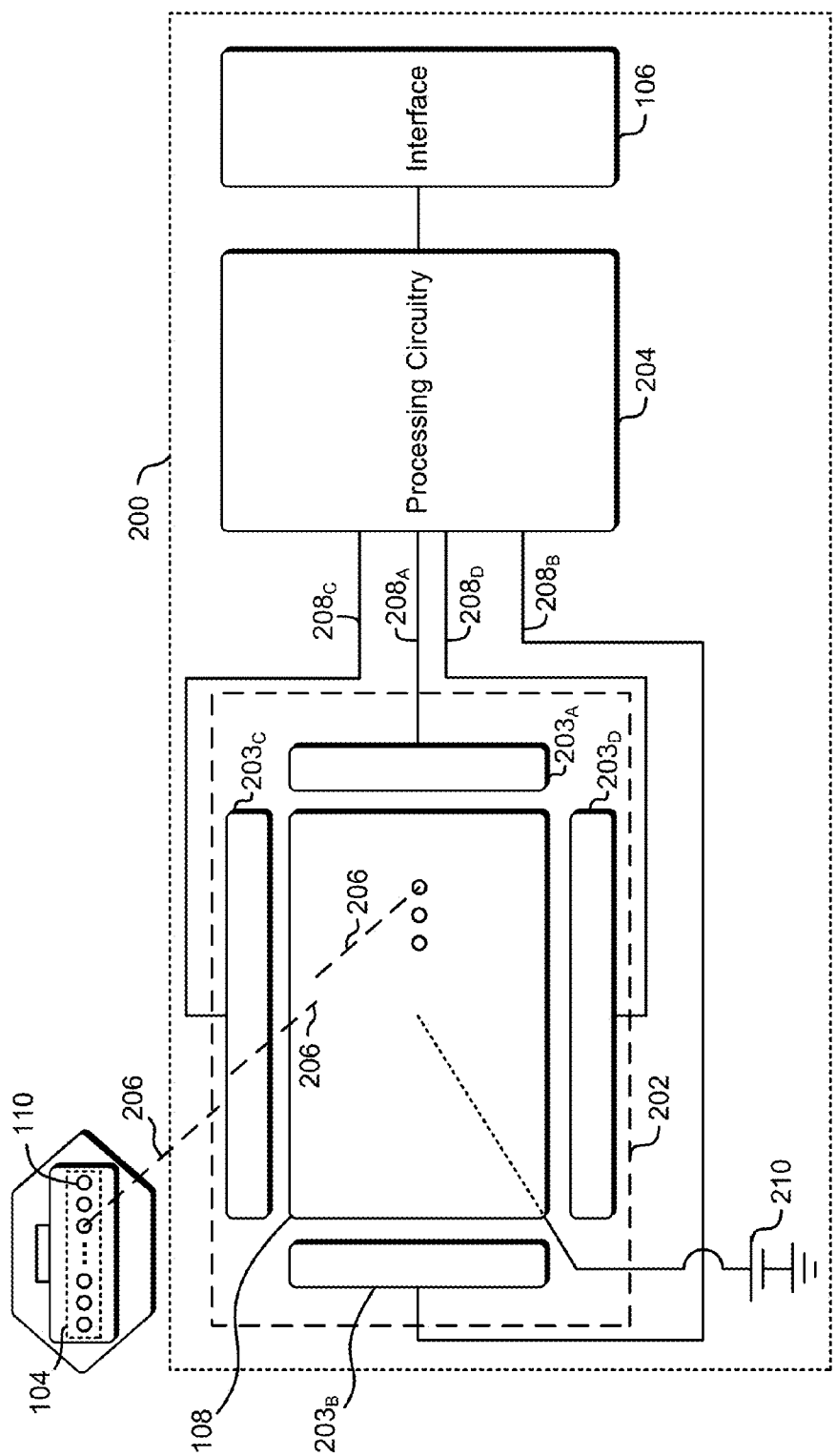
FIG. 3 shows a schematic of an optical fiber testing device in accordance with an embodiment.

FIG. 3 shows a schematic of an optical fiber testing device 200 in accordance with an embodiment of the present disclosure. The optical fiber testing device 200 is an example of the optical fiber testing device 100 described with reference to FIG. 1. The optical fiber testing device 200 comprises a position sensing detector 202, processing circuitry 204, and an interface 106. The position sensing detector 202 comprises the optical sensor 108 and a plurality of electrodes $203_{A-D}$ (collectively referred herein by the reference numeral 203).

The optical sensor 108 of the position sensing detector 202 has a single substrate optical sensing area that is sized sufficient enough to receive a plurality of optical signals 206 emanating from the optical fiber array 104. Examples of the position sensing detector 202 include a tetra-lateral position sensing detector from OSI Optoeletronics which is a Silicon photodiode detector and has a single resistive layer. The tetra-lateral position sensing detector has an optical sensing area of up to 1000 square millimeters ($mm^2$). The specification sheets of OSI Optoeletronics position sensing detector model numbers SC-4D, SC-10D, SC-25D and SC-50D are hereby incorporated by reference herein. Examples of the position sensing detector 202 also include the THORLABS lateral effect position-sensing detector (model number: PDP90A) whose specification sheet (Revision E, published on Jun. 12, 2014) is hereby incorporated by reference herein.

The plurality of optical signals 206 may all be received by the optical sensing area while the optical sensing area remains in a fixed position relative to the optical fiber array 104. Use of an optical sensing area that is sized sufficient enough to receive the plurality of optical signals 206 is advantageous in that it alleviates the need to independently couple an optical fiber testing device to each optical fiber 110 of the optical fiber array 104. It expedites testing the optical fiber array 104 because all of the optical fibers 110 may be tested at one time once the optical fiber array 104 is positioned with respect to the optical sensing area of the optical fiber testing device 200.

A plurality of electrodes 203 are electrically coupled to the optical sensing area of the position sensing detector 202 and disposed on or at an outer periphery of the optical sensing area. When an optical signal 206 impinges the optical sensing area, an electric potential is generated within the optical sensing area at the location where the optical signal impinges the optical sensing area. For example, a power supply device 210 may supply a potential to the optical sensing area. Arrival of the optical signal 206 at a location on the optical sensing area results in an electric potential being applied at that location. The electric potential causes current to flow to each of the plurality of electrodes 203 and be output as output signals by the plurality of electrodes 203. Because electrical resistance is distributed (for example, uniformly) over the optical sensing area, the greater the distance between each of the electrodes 203 and the location at which the optical signal 206 is incident on the optical sensing area, the greater the resistance encountered by electric currents generated at the location and consequently, the lower the output current will be at the respective electrodes. Conversely, the closer the location is to an electrode 203, the larger the current will be output by the electrode 203.

As a result of the optical signal 206 reaching the optical sensing area, the plurality of electrodes $203_{A-D}$ respectively output a plurality of output signals $208_{A-D}$. Each output signal of the plurality of output signals $208_{A-D}$ has an electrical characteristic (for example, an amount of current or voltage) that is a function of the proximity of the location at which the optical signal impinged on the optical sensing area to the respective electrode of the plurality of electrodes $203_{A-D}$.

Furthermore, an output signal 208 may have an electrical characteristic that is proportional to the intensity of the optical signal 206. For example, an output signal may have an amount of current that is proportional to the intensity of the optical signal 206, whereby as the intensity of the optical signal increases, so does the current level of the plurality of output signals $208_{A-D}$. As described herein, the plurality of output signals $208_{A-D}$ are used to determine both the location at which the optical signal 206 is incident on the optical sensor 108 and the intensity of the optical signal 206.

The plurality of electrodes 203 are electrically coupled to the processing circuitry 204. The plurality of output signals $208_{A-D}$ output by the plurality of electrodes $203_{A-D}$ are thus received by the processing circuitry 204. The processing circuitry 204 may determine an intensity of the optical signal 206 based at least in part on the plurality of output signals $208_{A-D}$. For example, the processing circuitry 204 may sum the plurality of output signals $208_{A-D}$ to generate an output signal aggregate and may use the output signal aggregate to determine the intensity of the optical signal 206.

Prior to use, the optical fiber testing device 100, 200 may be calibrated with signals having known intensities. During a calibration phase, optical signals with various intensities may be directed at the optical sensor 108 and the output signal aggregate may be determined for each optical signal. A functional relationship or a table may then be generated linking the optical signal intensity with the output signal aggregate. During a measurement phase, the functional relationship or table may be used to determine the optical signal intensity based at least in part on the measured output signal aggregate.

The processing circuitry 204 may also determine the location at which the optical signal 206 was incident on the optical sensor 108. An x-axis coordinate of the location may be determined based on a relative difference between the first output signal $208_A$ and the second output signal $208_B$. For example, if the current levels of the first output signal $208_A$ and the second output signal $208_B$ are equal, the x-axis coordinate of the location may be determined to be at a point of origin at the center of the optical sensing area between the electrodes $203_A$ and $203_B$. If the current level of the first output signal $208_A$ is greater than the current level of the second output signal $208_B$, the x-axis coordinate of the location may be determined to be closer to the electrode $203_A$ than the electrode $203_B$, and vice versa. Similarly, the y-axis coordinate of the location may be determined based on at least in part on a relative difference between the third output signal $208_C$ and the fourth output signal $208_D$. If the current levels of the third output signal $208_C$ and the fourth output signal $208_D$ are equal, the y-axis coordinate of the location may be determined to be at a point of origin at the center of the optical sensing area between the electrodes $203_C$ and $203_D$. If the current level of the third output signal $208_C$ is greater than the current level of the fourth output signal $208_D$, the y-axis coordinate of the location may be determined to be closer to the electrode $203_C$ than the electrode $203_D$, and vice versa.

To determine the polarity of the optical fiber array 104, the processing circuitry 204 uses the determined locations of the received optical signals to identify the receiving position for at least one optical fiber 110 in the optical fiber array 104. The receiving position of the at least one optical fiber 110 is then compared with its corresponding transmitting position to determine the polarity. As described with reference to FIG. 2 herein, if the receiving position is the same as the transmitting position for the optical fiber 110, a "Type A" polarity is determined. If the receiving position is transposed with respect to the transmitting position for the optical fiber 110, a "Type B" polarity is determined, and if the receiving position is pairwise transposed with a neighboring transmitting position, a "Type C" polarity is determined.

The transmitting or receiving positions may be consecutively numbered, for example, from left to right or from top to bottom starting with one. An offset between the receiving position and the transmitting position may be the difference between the receiving and transmitting position numbers. For example, if the offset is zero for any receiving position, then the polarity may be determined to be "Type A" polarity. If the offset is two or more for any receiving position then the polarity may be determined to be "Type B" polarity. If the offset is one for all receiving positions, then the polarity may be determined to be a "Type C" polarity.

The transmitting position of the optical fiber 110 may be known beforehand or apriori. In an embodiment, the transmitting position of the optical fiber 110 may be provided to the processing circuitry 204. Further, in alternative embodiments, the optical fiber testing device 100 may be configured to transmit the optical signal 206 through the optical fiber 110 and may, accordingly, know the transmitting position of the optical fiber 110 through which the detected optical signal 206 was transmitted. In yet further embodiments, optical signals having a known modulation may be transmitted at known transmitting positions. When the optical signals are received by the optical fiber testing device 200, each optical signal may be recognized from the known modulation and the relative receiving positions of the optical signals may be determined based on the locations at which the optical signals are received by the optical fiber testing device 200, as discussed herein. The receiving positions of one or more optical signals are then compared with the known transmitting positions to determine the polarity of the optical array.

The receiving position for an optical fiber 110 may be determined based on the location at which an optical signal emanating from the optical fiber 110 arrives at the optical sensor 108 relative to the locations of other optical signals emanating from other optical fibers 110 in the array 104. To accurately determine the receiving position of the optical fiber 110, it may be necessary to receive, at the optical sensor 108, optical signals 206 from every optical fiber 110 of the optical fiber array 104. When all of the optical signals 206 of the optical fibers 110 are received and their locations identified, the relative receiving position of each optical fiber 110 may be determined. For example, for a 1×12 array comprising a row of twelve optical fibers, the leftmost position may be identified after all of the optical signals emanating from the various positions have been received and after it has been determined that of the twelve optical signals received, the x-axis coordinate of the arrival location of the particular optical signal is farthest to the left compared to the other eleven optical signals. In the embodiment illustrated in FIG. 3, for example, the optical signal emanating from the leftmost position may have an x-axis coordinate indicating that its arrival location is closest to the second electrode $203_B$.

In various embodiments, a plurality of optical signals 206 may be sequentially transmitted through the plurality of optical fibers 110 of the optical array 104. The plurality of optical signals 206 may accordingly sequentially impinge on the optical sensor 108. As a result, the location of arrival of each optical signal 206 may be determined at each instance that the optical signal 206 is received. After determining the locations of arrival of the optical signals 206, the relative receiving positions of the optical fibers 110 carrying the optical signals 206 may be determined. For example, the receiving positions of the optical signals in the order of receipt may be rightmost, second from rightmost, third from rightmost, and so on until leftmost. If it was known by the testing device 200 (for example, by convention or explicit indication) that the transmission order of the optical signals in the array 104 was rightmost to leftmost, then the polarity of the optical array 104 may be determined as Type A. Conversely, if it was known that the transmission order was leftmost to rightmost, then the polarity of the optical array 104 may be determined as Type B due to the transposition between the receiving order and the transmission order.

After determining the polarity of the optical fiber array 104 or determining the intensity of an optical signal 206 as described herein, the processing circuitry 204 may provide an indication of the polarity or the intensity to the interface 106. The interface 106 facilitates outputting the polarity or the intensity to a user. In some embodiments, the determined intensity of the received optical signal 206 may be compared with a known transmit intensity of the optical signal to determine an amount of loss in the optical signal that occurred while the optical signal traversed the optical fiber 110. The interface 106 may facilitate outputting the determined optical signal loss to the user.

Figure 4:
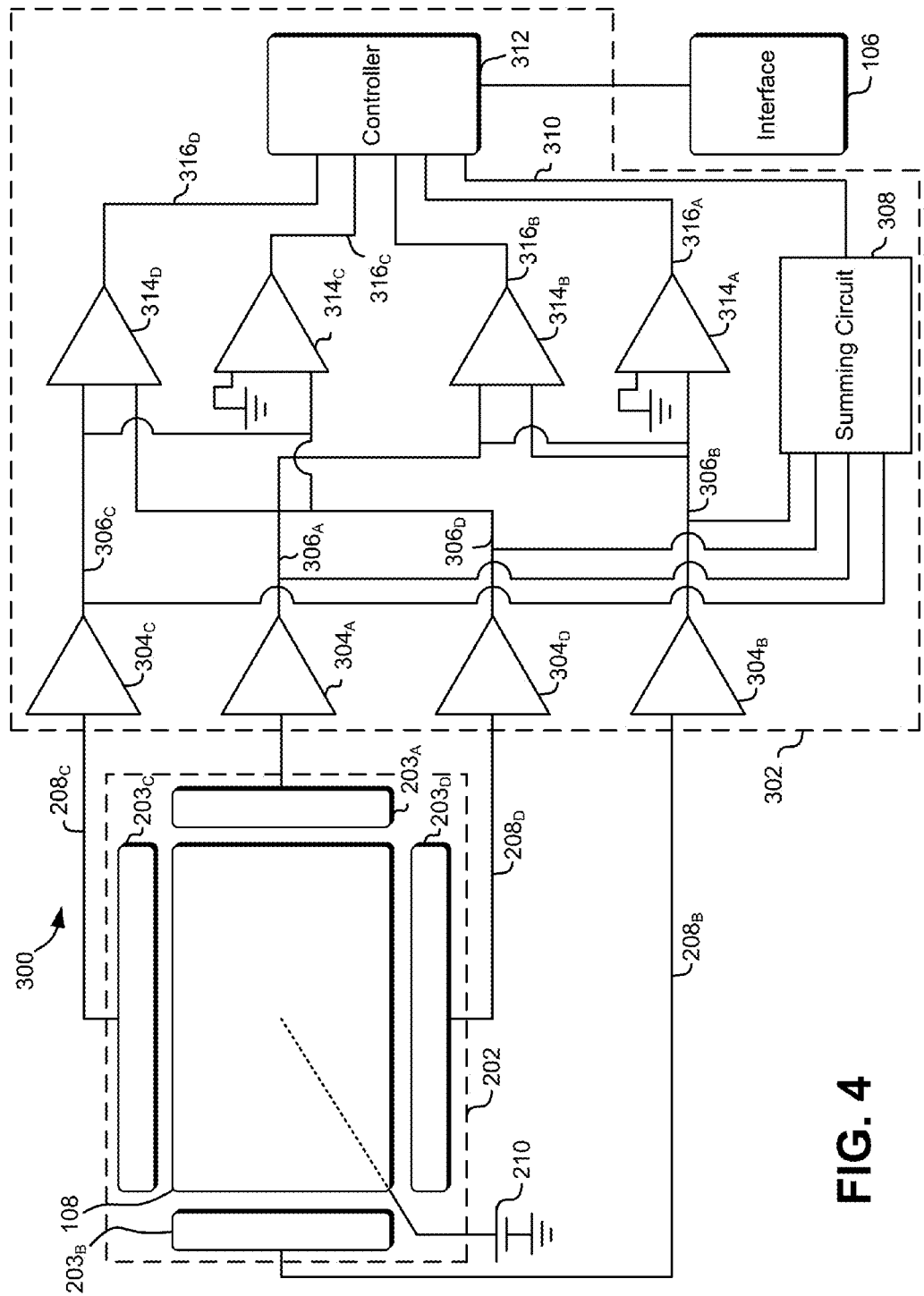
FIG. 4 shows a schematic of an optical fiber testing device in accordance with an embodiment.

FIG. 4 shows a schematic of an optical fiber testing device 300 in accordance with an embodiment of the present disclosure. The optical fiber testing device 300 comprises the position sensing detector 202, processing circuitry 302, and the interface 106. Elements of the optical fiber testing device 300 that are similar to those described with reference to FIGS. 1 and 2 have the same reference numeral. As described with reference to FIG. 3, the position sensing detector 202 comprises an optical sensor 108 and a plurality of electrodes $203_{A-D}$. The plurality of electrodes $203_{A-D}$ are respectively electrically coupled to a plurality of first amplifiers $304_{A-D}$ of the processing circuitry 302. The plurality of output signals $208_{A-D}$ that are respectively output by the plurality of electrodes $203_{A-D}$ are input to the respective plurality of first amplifiers $304_{A-D}$. The plurality of first amplifiers $304_{A-D}$ respectively amplify the plurality of output signals $208_{A-D}$ and respectively output a plurality of amplified signals $306_{A-D}$.

The plurality of first amplifiers $304_{A-D}$ are electrically coupled, at their output, to a summing circuit 308. The summing circuit 308 receives the plurality of amplified signals $306_{A-D}$ from the respectively plurality of first amplifiers $304_{A-D}$ and sums the plurality of amplified signals $306_{A-D}$ to generate an aggregate output signal 310. The summing circuit 308 is electrically coupled, at its output, to a controller 312 of the processing circuitry 302. The summing circuit 308 outputs the aggregate output signal 310 to the controller 312. The controller 312 determines an optical intensity of an optical signal received by the optical sensor 108 based on the aggregate output signal 310. As described herein, a signal level (for example, current or voltage) of the plurality of output signals $208_{A-D}$ is proportional to the intensity of the optical signal received by the optical sensor 108.

To determine the location at which the optical signal was incident on the optical sensing area of the optical sensor 108, the first amplified signal $306_A$ and the second amplified signal $306_B$ are provided to a first amplifier $314_A$ and a second amplifier $314_B$ of a plurality of second amplifiers $314_{A-D}$. The first amplifier $314_A$ aggregates the first amplified signal $306_A$ and the second amplified signal $306_B$ and outputs a horizontal axis aggregate signal $316_A$. The second amplifier $314_B$ calculates the difference between the first amplified signal $306_A$ and the second amplified signal $306_B$ and outputs a horizontal axis difference signal $316_B$. The controller 312 receives the horizontal axis aggregate signal $316_A$ and the horizontal axis difference signal $316_B$. The controller 312 may determine the horizontal coordinate (or x-axis coordinate) of the location at which the optical signal arrived at the optical sensing area of the optical sensor 108 as the quotient of the horizontal axis difference signal $316_B$ and the horizontal axis aggregate signal $316_A$.

Similarly for the vertical coordinate (or y-axis coordinate), the third amplified signal $306_C$ and the fourth amplified signal $306_D$ are provided to a third amplifier $314_C$ and a fourth amplifier $314_D$ of the plurality of second amplifiers $314_{A-D}$. The third amplifier $314_A$ aggregates the third amplified signal $306_C$ and the fourth amplified signal $306_D$ and outputs a vertical axis aggregate signal $316_C$. The fourth amplifier $314_D$ calculates the difference between the third amplified signal $306_C$ and the fourth amplified signal $306_D$ and outputs a vertical axis difference signal $316_D$. The controller 312 receives the vertical axis aggregate signal $316_C$ and the vertical axis difference signal $316_D$. The controller 312 may determine the vertical coordinate (or y-axis coordinate) of the location at which the optical signal arrived at the optical sensing area of the optical sensor 108 as the quotient of the vertical axis difference signal $316_C$ and the vertical axis aggregate signal $316_D$.

After determining the location at which the optical signal arrived at the optical sensing area, the controller 312 may determine the polarity of an optical array as described herein. The controller 312 may also (or alternatively) determine the optical intensity of the received optical signals as described herein. The controller 312 then outputs the polarity and/or optical signal intensity to the interface 106. The optical signal intensity of a received optical signal may further be compared with a known transmit intensity of the optical signal to determine the loss in the transmitted optical signal. The controller 312 may output the determined optical signal loss to the interface 106.

Figure 5:
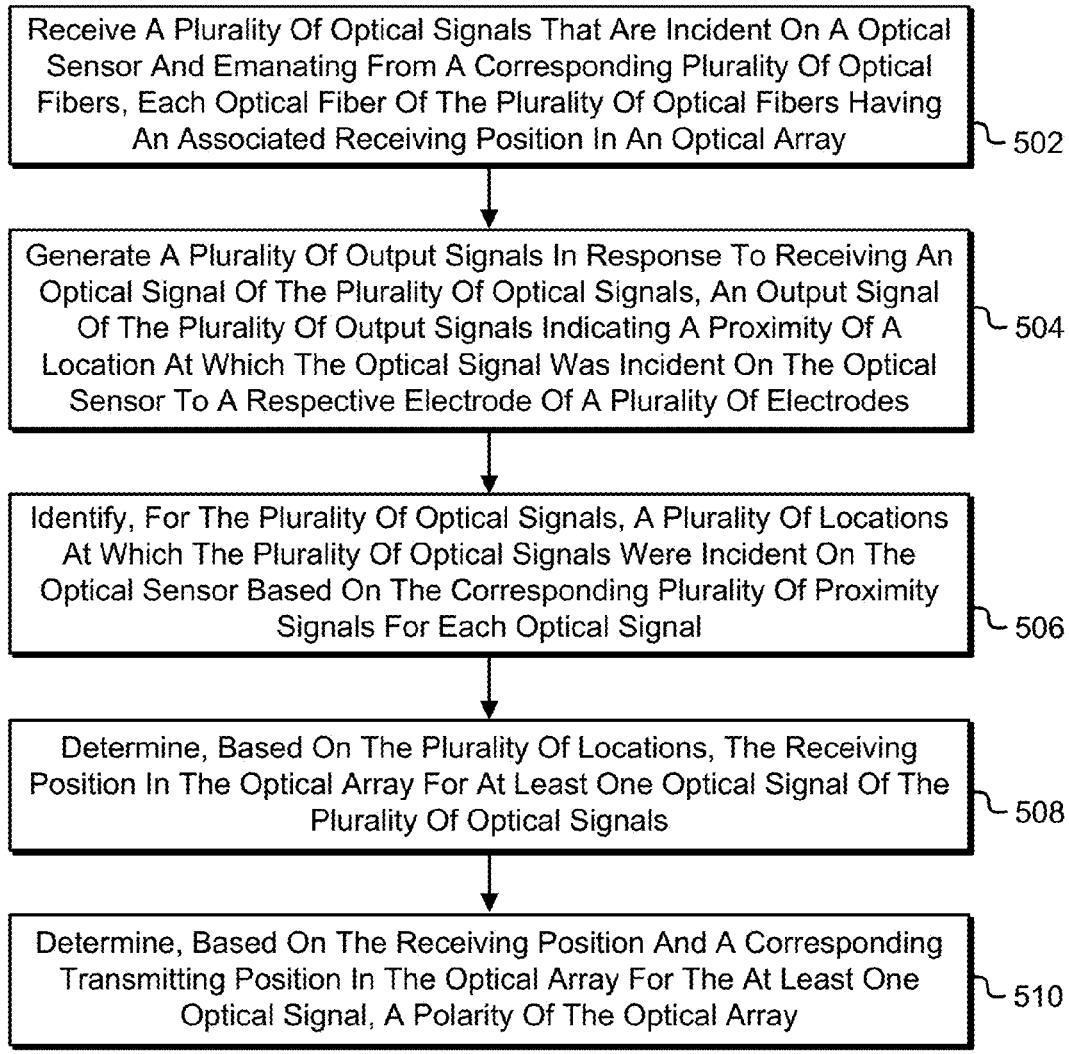
FIG. 5 shows a flow diagram of a method for determining a polarity of an optical array.

FIG. 5 shows a flow diagram of a method for determining a polarity of an optical array. In the illustrated method, an optical sensor, such as the optical sensor 108 described with reference to FIG. 3, receives 502 a plurality of optical signals that are emanating from a corresponding plurality of optical fibers. Each optical fiber of the plurality of optical fibers has an associated receiving position in an optical array. A plurality of electrodes in the optical sensor 108, such the plurality of electrodes $203_{A-D}$ described with reference to FIG. 3, generate 504 a plurality of output signals in response to receiving an optical signal of the plurality of optical signals. An output signal of the plurality of output signals indicates a proximity of a location at which the optical signal was incident on the optical sensor to a respective electrode of the plurality of electrodes.

Processing circuitry, such as the processing circuitry 204 described with reference to FIG. 3, then identifies 506, for the plurality of optical signals, a plurality of locations at which the plurality of optical signals were incident on the optical sensor based on the corresponding plurality of output signals for each optical signal. The processing circuitry determines 508, based on the plurality of locations, the relative receiving position in the optical array of at least one optical signal of the plurality of optical signals. The processing circuitry also determines 510 a polarity of the optical array based on the determined receiving position and a corresponding transmitting position in the optical array for the at least one optical signal.

Figure 6:
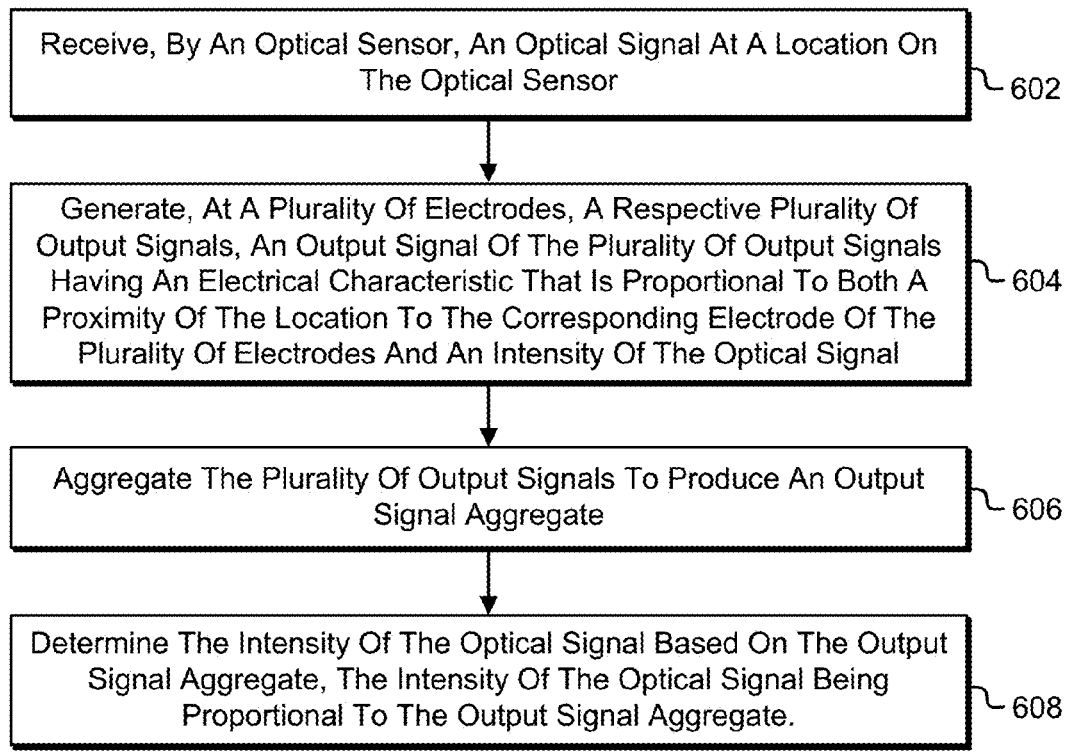
FIG. 6 shows a flow diagram of a method for determining optical signal intensity.

FIG. 6 shows a flow diagram of a method for determining optical signal intensity. In the illustrated method, an optical sensor receives 602 an optical signal at a location on the optical sensor 108. A plurality of electrodes in the optical sensor 108 then generate 604 a respective plurality of output signals. An output signal of the plurality of output signals has an electrical characteristic that is proportional to both a proximity of the location to the corresponding electrode of the plurality of electrodes and an intensity of the optical signal. Processing circuitry then aggregates 606 the plurality of output signals to produce an output signal aggregate. The processing circuitry also determines 608 the intensity of the optical signal based on the output signal aggregate, whereby the intensity of the optical signal is proportional to the output signal aggregate.

The various embodiments described above can be combined in various combinations to provide further embodiments of the present disclosure. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for determining an optical fiber array polarity comprising:
 a position sensing detector comprising:
  a sensor positionable with respect to an optical array, wherein the sensor receives, from the optical array, a plurality of optical signals that are incident on the sensor while the sensor remains in a fixed position relative to the optical array, the plurality of optical signals emanating from a corresponding plurality of optical fibers forming the optical array, each optical fiber of the plurality of optical fibers having an associated transmitting position and receiving position in the optical array relative to other optical fibers in the optical array; and
  a plurality of electrodes electrically coupled to the sensor, wherein the plurality of electrodes outputs a respective plurality of output signals in response to receipt of an optical signal of the plurality of optical signals by the sensor, the plurality of output signals being indicative of a location at which the optical signal of the plurality of optical signals was incident on the sensor; and
 processing circuitry electrically coupled to the plurality of electrodes, wherein the processing circuitry:
  receives the plurality of output signals for each of the plurality of optical signals;
  identifies respective locations at which the plurality of optical signals were incident on the sensor;
  determines, based on the identified locations, the receiving position in the optical array of at least one optical fiber of the plurality of optical fibers; and
  determines a polarity of the optical array based on the determined receiving position of the at least one optical fiber and a corresponding transmitting position in the optical array of the at least one optical fiber.

2. The apparatus of claim 1, wherein the processing circuitry further receives information indicating the transmitting position in the optical array of the at least one optical fiber.

3. The apparatus of claim 1, wherein determining the polarity of the optical array further includes determining an offset between the determined receiving position and the corresponding transmitting position of the at least one optical fiber.

4. The apparatus of claim 1, wherein the polarity of the optical array is determined to be a first type if the receiving position of the at least one optical fiber is the same as the corresponding transmitting position of the at least one optical fiber.

5. The apparatus of claim 1, wherein the polarity of the optical array is determined to be a second type if the receiving position of the at least one optical fiber is offset by one position from the corresponding transmitting position of the at least one optical fiber.

6. The apparatus of claim 1, wherein the polarity of the optical array is determined to be a third type if the receiving position of the at least one optical fiber is transposed from the corresponding transmitting position of the at least one optical fiber.

7. The apparatus of claim 1, wherein the processing circuitry further determines an order of receiving positions of the optical fibers by which the plurality of optical signals were detected to emanate from the optical fibers, and receives an order of transmitting positions of the optical fibers by which the plurality of optical signals were transmitted into the optical fibers.

8. The apparatus of claim 7, wherein determining the polarity of the optical array further includes comparing the order of the receiving positions and the order of the transmitting positions to identify an offset between the respective receiving and transmitting positions.

9. The apparatus of claim 1, further comprising:
 an interface communicatively coupled to the processing circuitry, wherein the interface receives an indication of the polarity of the optical array and indicates the polarity to a user.

10. The apparatus of claim 1, wherein the apparatus is selectively couplable to the optical array by an interchangeable adapter having a gender or shape compliant with a connector of the optical array.

11. The apparatus of claim 1, wherein:
 the optical array is optically coupled to the apparatus at a fixed position while the plurality of optical signals are incident on the sensor; and
 the sensor is formed of a single substrate having an optical sensing area of sufficient size to receive the plurality of optical signals while the sensor remains in a fixed position relative to the optical array.

12. The apparatus of claim 1, further comprising:
 an optical system that is optically coupled to the sensor and the optical array, wherein the optical system receives, from the optical array, the plurality of optical signals and redirects at least one optical signal of the plurality of optical signals to the optical array.

13. A method for determining optical fiber array polarity comprising:
 receiving, at a sensor of a position sensing detector, a plurality of optical signals from an optical array, wherein the plurality of optical signals are incident on the sensor while the sensor remains in a fixed position relative to the optical array, the plurality of optical signals emanating from a corresponding plurality of optical fibers forming the optical array, wherein the sensor is positionable with respect to the optical array and each optical fiber of the plurality of optical fibers has an associated transmitting position and receiving position relative to other optical fibers in the optical array;

outputting, by a plurality of electrodes of the position sensing detector, a respective plurality of output signals in response to receipt of an optical signal of the plurality of optical signals by the sensor, each output signal of the plurality of output signals indicating a proximity of a location at which the optical signal of the plurality of optical signals was incident on the sensor to a respective electrode of the plurality of electrodes;

identifying, for the plurality of optical signals, respective locations at which the plurality of optical signals were incident on the sensor, wherein the respective locations are identified based on the corresponding plurality of output signals for each received optical signal;

determining, based on the identified locations, the receiving position in the optical array of at least one optical fiber of the plurality of optical fibers; and determining a polarity of the optical array based on the determined receiving position and a corresponding transmitting position in the optical array of the at least one optical fiber.

14. The method of claim 13, further comprising:
receiving information indicating the corresponding transmitting position in the optical array of the at least one optical fiber.

15. The method of claim 13, wherein determining the polarity of the optical array further includes determining an offset between the determined receiving position of the at least one optical fiber and the corresponding transmitting position.

16. The method of claim 15, further comprising:
determining an order of receiving positions of the optical fibers by which the plurality of optical signals were detected to emanate from the optical fibers; and receiving an order of transmitting positions of the optical fibers by which the plurality of optical signals were transmitted into the optical fibers, wherein determining the polarity of the optical array further includes comparing the order of the receiving positions and the order of the transmitting positions to identify an offset between the respective receiving and transmitting positions.

17. An apparatus for measuring optical signal intensity comprising:
a position sensing detector comprising:
an optical sensor positionable with respect to an optical array, wherein the optical sensor has a single substrate optical sensing area sized sufficient to receive a plurality of optical signals from the optical array while the optical sensing area remains in a fixed position relative to the optical array, wherein the optical sensor receives an optical signal at a location within the optical sensing area; and a plurality of electrodes electrically coupled to the optical sensing area, wherein the plurality of electrodes output a respective plurality of output signals in response to receipt of the optical signal by the optical sensing area, wherein each output signal of the plurality of output signals has an electrical characteristic that is proportional to both an intensity of the optical signal and a proximity of the location at which the optical signal was received to a corresponding electrode of the plurality of electrodes;

an adder that receives and aggregates the plurality of output signals and produces an output signal aggregate for the optical signal; and processing circuitry electrically coupled to the adder, wherein the processing circuitry:
receives the output signal aggregate;
determines an intensity of the optical signal based on the output signal aggregate, wherein the determined intensity of the optical signal is proportional to the output signal aggregate;
receives the plurality of output signals for two or more of the plurality of optical signals;
identifies respective locations at which the two or more of the plurality of optical signals were incident on the optical sensor;
determines, based on the identified locations, a receiving position in the optical array of at least one optical fiber of a plurality of optical fibers of the optical array; and
determines a polarity of the optical array based on the determined receiving position of the at least one optical fiber and a corresponding transmitting position in the optical array of the at least one optical fiber.

18. The apparatus of claim 17, wherein:
the processing circuitry further determines a link loss associated with an optical fiber used for transmitting the optical signal at least in part on the determined intensity of the optical signal.

19. The apparatus of claim 18, wherein the processing circuitry determines the link loss by comparing the determined intensity of the optical signal with a transmission intensity of the optical signal as transmitted into the optical fiber.

20. The apparatus of claim 18, further comprising an interface communicatively coupled to the processing circuitry, wherein the interface receives an indication of the determined link loss from the processing circuitry and indicates the determined link loss to a user.

* * * * *